Figure 1:
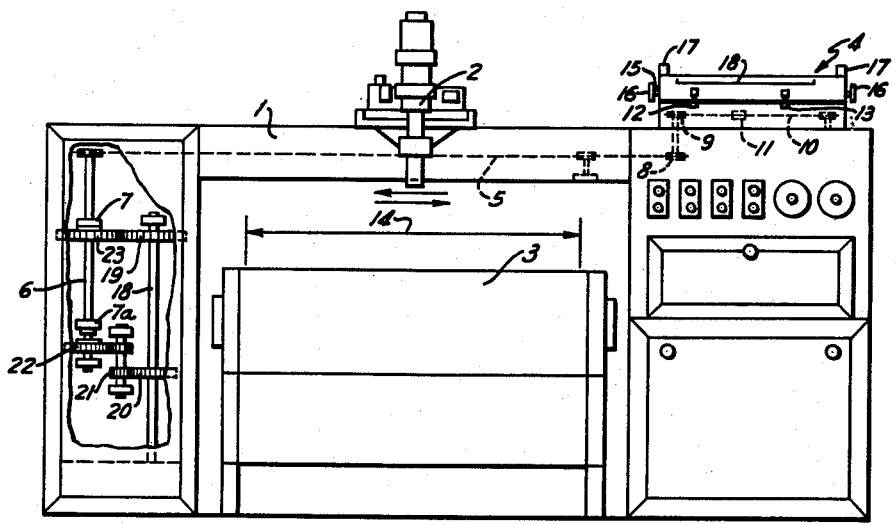

May 3, 1960

E. WEINBRENNER ET AL 2,935,100

APPARATUS FOR RECIPROCATING A POURING
TRUCK OVER A CONVEYOR

Filed July 25, 1957

INVENTORS
ERWIN WEINBRENNER, PETER HOPPE,
KARL BREER & HEINZ KISTENEICH.
BY

ATTORNEYS

United States Patent Office 2,935,100
Patented May 3, 1960

2,935,100

APPARATUS FOR RECIPROCATING A POURING TRUCK OVER A CONVEYOR

Erwin Weinbrenner, Leverkusen, Peter Hoppe, Troisdorf, Karl Breer, Koln-Flittard, and Heinz Kisteneich, Troisdorf, Germany, assignors of one-third to Farbenfabriken Bayer Aktiengesellschaft, Leverkusen, one-third to Maschinenfabrik Karl Hennecke, Birlinghoven/Siegkreis, Germany, both corporations of Germany, and one-third to Mobay Chemical Company, Pittsburgh, Pa., a corporation of Delaware Application July 25, 1957, Serial No. 674,069

Claims priority, application Germany July 26, 1956

6 Claims. (Cl. 141—131)

This invention relates generally to a mixing and pouring apparatus and, more particularly, to an improved apparatus for pouring the mixed liquid components of a polyurethane plastic.

It has been disclosed heretofore to mix an organic compound having at least two reactive hydrogen atoms with an organic polyisocyanate and water to form a cellular polyurethane plastic. An apparatus well suited for this purpose is disclosed in U.S. Patent 2,764,565. In such an apparatus the more viscous organic compound having at least two reactive hydrogen atoms is introduced under pressure into a mixing nozzle and the other less viscous components are injected under a pressure greater than that in the nozzle into the organic compound having at least two reactive hydrogen atoms. In an alternate method, the organic compound having at least two reactive hydrogen atoms is reacted with an organic polyisocyanate to form a prepolymer or adduct having terminal NCO groups and this prepolymer is introduced into the mixing nozzle. Water and additional polyisocyanate, if required, are then injected into the prepolymer.

The mixing head and pouring device must move with respect to the mold or other means into which the viscous reaction mixture is poured in order that proper distribution will be obtained. The mixing head and pouring device ordinarily travels in one direction while the receiving means rides on a conveyor traveling in a transverse direction. The mixing head moves back and forth across the receiving means until liquid has been poured throughout the length of the receiving means and then reverses to pour liquid again throughout the length of the receiving means on its return trip. Meanwhile, the conveyor has moved the receiving means so that the liquid poured on the return trip is adjacent the first poured liquid and not on top of it. The combined mixing head and pouring device is connected to each component supply source by means of flexible pipe or tubing through which the components are pumped or otherwise moved into the mixing nozzle. The pouring head is reciprocated with a rhythm adapted to the specific type of reaction liquid in the mixing head and in coordination with the speed of the conveyor belt. The distance the mixing head travels is determined by the shape and size of the article being produced by the molding operation.

The pouring head may be driven by means of a chain with a thrust rod actuated by the pouring head itself being used to effect a hydraulic reversal of the direction of travel. An electromagnetic clutch may be used to reverse the direction of the pouring head, the clutch being actuated by the pouring head striking reversing switches fixed on the bridge carrying the mixing head. Although these apparatuses are adaptable for making most objects by pouring a polyurethane reaction mixture into a mold, it is difficult to pour films of liquid having a width of from about 2 to about 3 meters or larger. It has been found that control of the reversal points of the direction of travel is difficult. In addition, it is impossible to alter safely the position of the reversing switches while the apparatus is being used and the pouring device is in operation.

It is therefore an object of this invention to provide an improved apparatus for pouring a reaction liquid capable of forming polyurethane plastic. Another object of the invention is to provide a pouring device for the reaction liquid of a polyurethane plastic with a novel means for controlling the length of travel of the pouring device over a receiving means for the reaction liquid. Still another object of the invention is to provide an improved means for controlling the movement of a pouring head on a mixing apparatus adapted for mixing the components of a polyurethane plastic.

Figure 2:
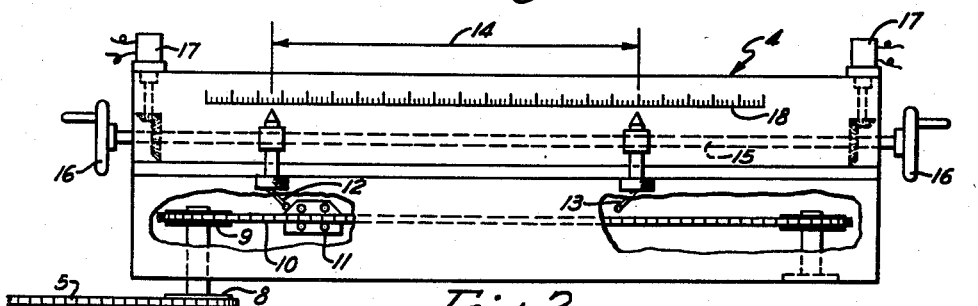
Figure 3:
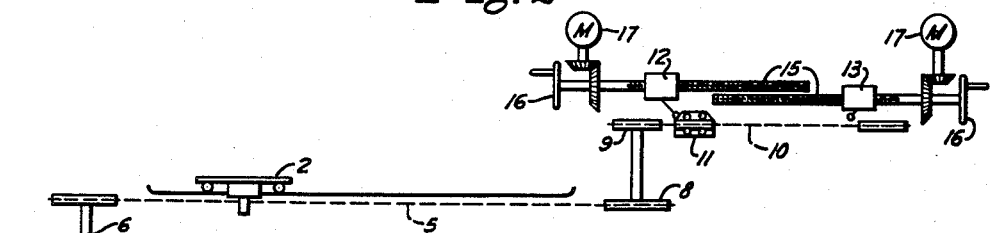

Other objects will become apparent from the following description with reference to the accompanying drawing in which Figure 1 is a front elevation view of one embodiment of the invention;

Figure 2 is an enlarged front elevation view of one embodiment of the device which controls the movement of the pouring device; and Figure 3 is a schematic view of one preferred embodiment of the invention.

Generally speaking, the foregoing objects are accomplished in accordance with this invention by providing an apparatus having, in combination, a means for mixing the components of a polyurethane plastic and pouring the resulting reaction mixture, said means being movable with respect to the means provided for receiving the reaction liquid, and a means for controlling the movement of the mixing device with respect to the receiving means. More specifically, the invention provides a combined mixing and pouring device for polyurethane plastics with a device which regulates the transverse movement of the pouring device across the receiving means. The "combined mixing and pouring device" is frequently referred to herein as "pouring device" for convenience. The controlling device is an adjustable limit control device having spaced reversing micro-switches which, when struck, send an electrical impulse to a relay which reverses an electromagnetic clutch and thus reverses the direction of travel of the pouring device. The microswitches are actuated when struck by an abutment mounted on a chain drive which is driven by the chain drive which moves the pouring device. The chain drive having the abutment is driven by the first chain drive through sprocket wheels and the rate of travel is different from that moving the pouring device so that the distance traveled by the abutment is only a fraction of that traveled by the pouring device. For example, the distance traveled by the abutment may be only one-fifth, one-fourth or one-third the distance traveled by the pouring device. The reversing switches are mounted on two separate threaded spindles which may be rotated either manually or by means of a suitable motor to locate the switches in the proper position. The device is provided with a suitable scale which serves as a guide for adjusting the position of the reversing switches.

Using this apparatus it is possible to fix the required length of travel of the reciprocating abutment of the control device by adjusting the reversing switch spacings by two separate spindle drives. In this way, the reversal points of the pouring truck are determined by the reversing switches of the control device in the selected position being actuated by contacting the control device abutment.

The construction of the control device makes it possible for the position of the reversing switches, and thus the working breadth also, to be changed during production. It is also possible to carry out charging of the molds on one side during the travel, this being affected by the left-hand or right-hand reversing switch in the control device being independently displaced.

The control device also offers the advantage that a continuously repeating change of the block-width can be effected during production, so that blocks with any desired side contours and widths can be formed. For this purpose, the spindles for the adjustment of the reversing switches can each be actuated alternately by an associated motor.

Referring now to the drawing, Figure 1 illustrates the combination of a mixing and pouring device 2 and an adjustable limit control device for reversing the movement of device 2. Pouring device 2 is moved transversely by chain 5 on bridge 1 over conveyor 3 which may carry any suitable receiving means or mold having a width designated as 14. Chain 5 is reversibly driven by a drive shaft 6 mechanically connected with a suitable motor through a pair of electromagnetic clutches 7 and 7a. The movement of mixing and pouring device 2 is reversed approximately when it reaches the edges of the conveyor 3. The motor turns the shaft 18 with its gears 19 and 20 in one direction. During operation, gear 19 continuously turns gear 23 which is rotatably mounted on drive shaft 6. Gear 20 drives an intermediate gear 21 (illustrated for clarity as a pair of axially-connected gears) which in turn rotates gear 22 rotatably mounted on drive shaft 6. In the view shown, the plate of the electromagnetic clutch 7 is engaged with the gear 23 so that the drive shaft 6 is rotating in a direction opposite to that of shaft 18. When clutch 7 is disengaged and clutch 7a engages, drive shaft 6 will rotate in the same direction as shaft 18.

A second chain drive 10 is connected to chain drive 5 through axially connected sprocket wheels 8 and 9 as best shown in Figure 2. Chain 10 is provided with an abutment 11 which projects upwardly to the point where it will strike micro-switches 12 and 13. When abutment 11 strikes switch 12 an impulse is sent to a relay which disengages the plate of clutch 7a and engages the plate of the other clutch 7 to reverse the direction of chain 5. In other words, when the reversing switches 12 and 13 are struck by abutment 11, electromagnetic clutches 7 and 7a on drive shaft 6 are engaged and disengaged, or vice versa, so that the direction of rotation of shaft 6 is reversed. The working width 14 of the pouring head 2 is thus determined by the setting of the two reverse switches 12 and 13. As pointed out above, the size of sprocket wheels 8 and 9 may be adjusted so that the actual spread between switches 12 and 13 is only a fraction of the distance 14, such as, for example, only one-third, one-fourth or one-fifth thereof. In the embodiment shown in Figure 2, the position of switches 12 and 13 is changed by rotating hand wheels 16 or by means of motors 17 to turn spindles 15. The switches are threadably mounted on the spindles. Scale 18 is provided to assist in the setting of the proper length of travel of mixing device 2. Since two spindles 15 are provided, the reversing switches 12 and 13 can be positioned independently of each other.

Figure 3 illustrates in schematic form the relationships between the control device, the pouring and mixing device, and the drive reversing device.

The apparatus provided by this invention may be used in making polyurethane plastics from any combination of components. It is preferred, however, to use it for making polyurethane plastics in accordance with the process disclosed by Hoppe et al. in U.S. Patent 2,764,565. The mixing and pouring device may be the apparatus disclosed in that patent or any other movable mixing and pouring device. Inasmuch as the invention does not involve any changes in the proportions or kind of components used for making the polyurethane plastics, it is not considered necessary to discuss the chemistry involved. Any of the various components disclosed in the aforesaid patent may be mixed together by any suitable process and the resulting reaction mixture, before chemical reaction to form a solidified product, can be poured from the movable pouring device while its direction of travel is determined by the adjustable limit control device provided herein. It is preferred, however, to mix the components together by injecting the organic polyisocyanate and catalyst into the more viscous organic compound having at least two reactive hydrogen atoms.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. In an apparatus for the production of plastic articles, the apparatus comprising in combination, a base, a conveyer, a bridge positioned thereover with a reciprocally movable pouring truck thereon and a mechanical reversible drive therefor including an electromagnetic clutch; an adjacent control device comprising a pair of adjustably spaced-apart reversing switches movably mounted on an element having longitudinal extent and with a movable actuating abutment substantially therebetween mechanically linked with the drive of the apparatus.

2. In an apparatus for the production of plastic articles, the apparatus comprising in combination, a base, a conveyer, a bridge positioned thereover with a reciprocally movable pouring truck thereon and a mechanical reversible drive therefor including an electromagnetic clutch; an adjacent control device comprising a pair of spaced-apart adjustably-fixed reversing switches arranged on two separate manually driven spindles with a movable actuating abutment substantially therebetween mechanically linked with the drive of the apparatus.

3. In an apparatus for the production of plastic articles, the apparatus comprising in combination, a base, a conveyer, a bridge positioned thereover with a reciprocally movable pouring truck thereon and a mechanical reversible drive therefor including an electromagnetic clutch; an adjacent control device comprising a pair of spaced-apart adjustably-fixed reversing switches arranged on two separate mechanically driven spindles with a movable actuating abutment substantially therebetween mechanically linked with the drive of the apparatus.

4. In an apparatus for the production of plastic articles, the apparatus comprising in combination, a base, a conveyer, a bridge positioned thereover with a reciprocally movable pouring truck thereon and a mechanical reversible drive therefor including an electromagnetic clutch; an adjacent control device comprising a pair of spaced-apart adjustably-fixed reversing switches mechanically arranged on a spindle with a movable actuating abutment substantially therebetween mechanically linked with the drive of the apparatus and a scale for guiding the adjustment of the reversing switches.

5. In an apparatus for the production of plastic articles, the apparatus comprising, in combination, a base, a conveyer, a bridge positioned thereover with a reciprocally movable pouring truck thereon and a manual reversible drive therefor including an electromagnetic clutch; an adjacent control device comprising a pair of adjustably spaced-apart reversing switches movably mounted on an element having longitudinal extent and manually arranged on a spindle with a movable actuating abutment substantially therebetween manually linked with the drive of the apparatus.

6. In an apparatus adapted for the production of plastic articles of varying widths, the apparatus comprising, in combination, a base, a conveyer, a bridge positioned thereover with a reciprocally movable pouring truck thereon and a mechanical reversible drive therefor including an electromagnetic clutch, an adjacent control device comprising a pair of adjustably spaced-apart reversing switches movably mounted on an element having longitudinal extent and mechanically arranged on a spindle with a movable actuating abutment substantially therebetween mechanically linked with the drive of the apparatus.

References Cited in the file of this patent

UNITED STATES PATENTS

| | | |
|---|---|---|
| 2,705,427 | Schipper | Apr. 5, 1955 |
| 2,728,238 | Paasche | Dec. 27, 1955 |
| 2,821,825 | Gartner | Feb. 4, 1958 |